(12) United States Patent
Gimvang

(10) Patent No.: US 7,737,195 B2
(45) Date of Patent: Jun. 15, 2010

(54) ANTI-GRAFFITI COATING

(75) Inventor: Bo H. Gimvang, South Daytona, FL (US)

(73) Assignee: Xurex, Inc., Albuquerque, NM (US)

( * ) Notice: Subject to any disclaimer, the term of this patent is extended or adjusted under 35 U.S.C. 154(b) by 37 days.

(21) Appl. No.: 12/288,940

(22) Filed: Oct. 24, 2008

(65) Prior Publication Data

US 2009/0111910 A1 Apr. 30, 2009

Related U.S. Application Data

(60) Provisional application No. 60/982,717, filed on Oct. 25, 2007, provisional application No. 61/048,548, filed on Apr. 28, 2008.

(51) Int. Cl.
*C08K 5/14* (2006.01)
*C08K 5/16* (2006.01)
*C08K 5/20* (2006.01)
*C08K 5/24* (2006.01)
*C08K 5/053* (2006.01)
*C08K 5/5415* (2006.01)
*C08K 3/34* (2006.01)

(52) U.S. Cl. ............... 523/122; 524/188; 524/262; 524/386; 524/450

(58) Field of Classification Search ............... 523/122; 524/188, 262, 386, 450
See application file for complete search history.

(56) References Cited

U.S. PATENT DOCUMENTS

| 4,435,219 | A | * | 3/1984 | Greigger ............ 106/287.16 |
| 4,571,372 | A | * | 2/1986 | Urawa et al. ............ 430/122.2 |
| 5,998,525 | A |   | 12/1999 | Wang et al. |
| 2001/0032568 | A1 |   | 10/2001 | Schutt |
| 2004/0192835 | A1 |   | 9/2004 | Steidl et al. |

* cited by examiner

*Primary Examiner*—Kriellion A Sanders

(57) ABSTRACT

A non-sacrificial, penetrating, anti-graffiti coating consisting essentially of the combination of alkali metal silicate, such as for example potassium, lithium or sodium silicate, deionized water, ethylene-glycol colloidal silica, aminopropyl oxysilane, fluorinated polyurethane, and alkali metal methyl siliconate, such as for example potassium, lithium or sodium siliconate.

20 Claims, No Drawings

ANTI-GRAFFITI COATING

This patent application claims the benefit of U.S. Provisional Patent Application Ser. No. 60/982,717, filed Oct. 25, 2007, and U.S. Provisional Patent Application Ser. No. 61/048,548, filed Apr. 28, 2008.

BACKGROUND OF THE INVENTION

This invention relates generally to the field of surface treatments and coatings for substrates and surfaces, and more particularly relates to treatments and coatings that possess anti-graffiti properties.

A common problem encountered with exterior surfaces that are exposed in public places, such as building walls, storage tanks, railroad cars, etc., is that such surfaces are often defaced and vandalized with spray paint or other marking materials by so-called graffiti artists. This is a worldwide problem and the total aggregate of the time and expense involved in the removal or covering over of the graffiti is immense.

One solution to address the graffiti problem is to provide coatings for the surfaces that prevent the spray paint or other marking material from properly adhering to the surfaces at the time it is applied, such that it becomes impossible for the graffiti artist to create a work of acceptable quality, thereby discouraging the effort. Another solution is to provide coatings that, while not affecting the adherence of the spray paint to any great degree at the time of application, reduce the adhesion of the cured paint such that it is easily removed from the surface at a later time, such as by pressure washing or wiping with solvents, for example. Many common anti-graffiti coatings are polyurethane-based. Unfortunately, these PU coatings and similar coatings are only surface coatings and are therefore considered as sacrificial coatings, in the sense that the anti-graffiti coatings need to be reapplied after only a few cleanings with solvents or by pressure washing because the cleaning process removes the outer layer of the anti-graffiti coating along with the spray paint. In addition, the vandal community has learned to remove the known anti-graffiti coatings using fire or acids prior to vandalizing the surfaces.

It is an object of this invention to provide a novel coating that possesses anti-graffiti properties, such that graffiti applied to the coating is easily removed. It is a further object to provide such a coating that is a penetrating coating, such that it is not merely a surface coating. It is a further object to provide such a penetrating coating that is applicable to most surfaces, including metal, organic or inorganic surfaces. It is a further object to provide such a penetrating coating that is highly resistant to fire or chemical attack, and which provides a surface with high surface tension to reduce the adhesion of the paint. It is a further object to provide such a penetrating coating that has a long working life and remains effective over many cleanings by solvents or pressure washing, for example up to 25 to 30 cleanings. This object and additional objects not expressly stated will become apparent upon review of the remaining disclosure.

SUMMARY OF THE INVENTION

The invention is a non-sacrificial, anti-graffiti coating that penetrates the substrate surface in addition providing a protective outer layer, the coating providing a surface possessing high surface tension and high chemical resistance against the solvents within the spray paint and other marking materials, such that the spray paint and like marking materials will not adequately adhere to the coating and is easily removed, such as by wiping within an hour or so of application, or later by simple hose washing. The anti-graffiti coating of the invention remains effective for a significantly greater number of cleanings than known anti-graffiti coatings, is resistant to degradation or removal by fire or chemical attack, and does not significantly alter the appearance of the surface to which it is applied, the anti-graffiti coating being relatively transparent and low gloss.

In general, the non-sacrificial, penetrating, anti-graffiti coating consists essentially of the combination of alkali metal silicate, such as for example potassium, lithium or sodium silicate, ethylene-glycol colloidal silica, aminopropyl oxysilane, fluorinated polyurethane, and alkali metal methyl siliconate, such as for example potassium, lithium or sodium siliconate. Deionized water is optionally added to alter the viscosity of the coating.

DETAILED DESCRIPTION OF THE INVENTION

The invention is a non-sacrificial, anti-graffiti coating that penetrates the substrate surface in addition providing a protective outer layer, the coating providing a surface possessing high surface tension and high chemical resistance against the solvents within the spray paint and other marking materials, such that the spray paint and like marking materials will not adequately adhere to the coating and is easily removed, such as by wiping within an hour or so of application, or later by simple hose washing. The anti-graffiti coating of the invention remains effective for a significantly greater number of cleanings than known anti-graffiti coatings, is resistant to degradation or removal by fire or chemical attack, and does not significantly alter the appearance of the surface to which it is applied, the anti-graffiti coating being essentially transparent and possessing a low gloss or flat finish. The coating may be applied using conventional techniques, such as brushing, spraying, rolling, immersing, etc.

In general, the non-sacrificial, penetrating, anti-graffiti coating consists essentially of the combination of alkali metal silicate, such as for example potassium, lithium or sodium silicate, ethylene-glycol colloidal silica, aminopropyl oxysilane, fluorinated polyurethane, and alkali metal methyl siliconate, such as for example potassium, lithium or sodium siliconate. Deionized water is optionally added to alter the viscosity of the coating.

In a preferred embodiment, the alkali metal silicate is present in the combination in the range of approximately 40 to 60 wt %, the ethylene-glycol colloidal silica is present in the combination in the range of approximately 5 to 20 wt %, the aminopropyl oxysilane is present in the combination in the range of approximately 0.5 to 1.5 wt %, the fluorinated polyurethane is present in the combination in the range of approximately 10 to 30 wt %, and the alkali metal methyl siliconate is present in the combination in the range of approximately 10 to 30 wt %. Deionized water is optionally added up to approximately 10 wt % to thin the composition for ease of application. A biocide additive may also be added into the coating composition.

It is contemplated that equivalents and substitutions for elements set forth above may be obvious to those of ordinary skill in the art, and therefore the true scope and definition of the invention is to be as set forth in the following claims.

I claim:

1. An anti-graffiti surface coating consisting essentially of the combination of:
   alkali metal silicate;
   ethylene-glycol colloidal silica;

aminopropyl oxysilane;
fluorinated polyurethane; and
alkali metal methyl siliconate;
the coating characterized in that it is a surface-penetrating coating, is chemically resistant, and possesses a surface tension higher than the surface tension of the surface to which it is applied, whereby paint applied to said coating is easily removed.

2. The coating of claim 1, wherein:
said alkali metal silicate is present in the combination in the range of approximately 40 to 60 wt %;
said ethylene-glycol colloidal silica is present in the combination in the range of approximately 5 to 20 wt %;
said aminopropyl oxysilane is present in the combination in the range of approximately 0.5 to 1.5 wt %;
said fluorinated polyurethane is present in the combination in the range of approximately 10 to 30 wt %; and
said alkali metal methyl siliconate is present in the combination in the range of approximately 10 to 30 wt %.

3. The coating of claim 1, further comprising deionized water.

4. The coating of claim 2, further comprising deionized water.

5. The coating of claim 4, wherein said deionized water is present in the combination in an amount up to approximately 10 wt %.

6. The coating of claim 1, wherein said alkali metal silicate is chosen from the group of alkali metal silicates consisting of potassium silicate, lithium silicate and sodium silicate.

7. The coating of claim 2, wherein said alkali metal silicate is chosen from the group of alkali metal silicates consisting of potassium silicate, lithium silicate and sodium silicate.

8. The coating of claim 3, wherein said alkali metal silicate is chosen from the group of alkali metal silicates consisting of potassium silicate, lithium silicate and sodium silicate.

9. The coating of claim 1, wherein said alkali metal methyl siliconate is chosen from the group of alkali metal methyl siliconates consisting of potassium methyl siliconate, lithium methyl siliconate and sodium methyl siliconate.

10. The coating of claim 2, wherein said alkali metal methyl siliconate is chosen from the group of alkali metal methyl siliconates consisting of potassium methyl siliconate, lithium methyl siliconate and sodium methyl siliconate.

11. The coating of claim 3, wherein said alkali metal methyl siliconate is chosen from the group of alkali metal methyl siliconates consisting of potassium methyl siliconate, lithium methyl siliconate and sodium methyl siliconate.

12. The coating of claim 6, wherein said alkali metal methyl siliconate is chosen from the group of alkali metal methyl siliconates consisting of potassium methyl siliconate, lithium methyl siliconate and sodium methyl siliconate.

13. The coating of claim 7, wherein said alkali metal methyl siliconate is chosen from the group of alkali metal methyl siliconates consisting of potassium methyl siliconate, lithium methyl siliconate and sodium methyl siliconate.

14. The coating of claim 8, wherein said alkali metal methyl siliconate is chosen from the group of alkali metal methyl siliconates consisting of potassium methyl siliconate, lithium methyl siliconate and sodium methyl siliconate.

15. The coating of claim 1, further consisting of a biocide additive.

16. An anti-graffiti surface coating consisting of the combination of:
alkali metal silicate;
ethylene-glycol colloidal silica;
aminopropyl oxysilane;
fluorinated polyurethane; and
alkali metal methyl siliconate;
the coating characterized in that it is a surface-penetrating coating, is chemically resistant, and possesses a surface tension higher than the surface tension of the surface to which it is applied, whereby paint applied to said coating is easily removed.

17. The coating of claim 16, wherein:
said alkali metal silicate is present in the combination in the range of approximately 40 to 60 wt %;
said ethylene-glycol colloidal silica is present in the combination in the range of approximately 5 to 20 wt %;
said aminopropyl oxysilane is present in the combination in the range of approximately 0.5 to 1.5 wt %;
said fluorinated polyurethane is present in the combination in the range of approximately 10 to 30 wt %; and
said alkali metal methyl siliconate is present in the combination in the range of approximately 10 to 30 wt %.

18. The coating of claim 16, further comprising deionized water.

19. The coating of claim 16, wherein said alkali metal silicate is chosen from the group of alkali metal silicates consisting of potassium silicate, lithium silicate and sodium silicate.

20. The coating of claim 16, wherein said alkali metal methyl siliconate is chosen from the group of alkali metal methyl siliconates consisting of potassium methyl siliconate, lithium methyl siliconate and sodium methyl siliconate.

* * * * *